UNITED STATES PATENT OFFICE.

CHRISTOPHER RIS, OF BASLE, SWITZERLAND, ASSIGNOR TO JOHN R. GEIGY & CO., OF SAME PLACE.

DISAZO DYE FROM STILBENE.

SPECIFICATION forming part of Letters Patent No. 644,462, dated February 27, 1900.

Application filed September 9, 1899. Serial No. 729,944. (Specimens.)

*To all whom it may concern:*

Be it known that I, CHRISTOPHER RIS, a citizen of the Republic of Switzerland, residing in Basle, Switzerland, have invented certain new and useful Disazo Coloring-Matters Derived from Stilbene, of which the following is a specification.

This invention (for which patents have been applied for in Germany, No. G. 13,218, under date of February 27, 1899; in England, No. 6,651, under date of March 28, 1899, and in France, No. 274,525, under date of March 7, 1899) refers to the production of new orange to brown disazo coloring-matters by diazotization of the product of condensation from two molecules of paranitrotoluenesulfoacid with one molecule of paraphenylenediamin and combination with a suitable compound.

The following is the formula of the new coloring-matters:

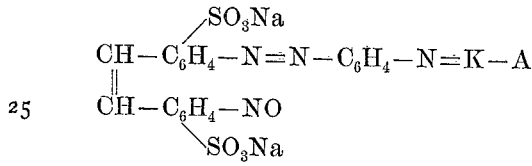

wherein A designates any compound suitable for the formation of an azo dye, such as phenol, orthocresol, metaphenylenediamin, metatoluylenediamin, and beta$_1$alpha$_4$amidonaphthol-beta$_3$sulfoacid and its alkylated and alphylated derivatives.

Example I: Sixty kilos of the said product of condensation (from two molecules of paranitrotoluenesulfoacid and one molecule of paraphenylenediamin) are dissolved in four hundred liters of boiling water and left to cool. Ice is added, also forty kilos of hydrochloric acid of thirty-three per cent., and diazotation accomplished by the gradual addition of seven kilos of nitrite of sodium. After stirring well for some hours the diazotation is complete. The thus-obtained diazo compound is introduced into a solution of 9.3 kilos of phenol with four kilos of caustic soda and thirty kilos of carbonate of sodium in three hundred liters of water. The mass is then heated to boiling and the coloring-matter filtered off and pressed. Then it is dissolved in about two hundred liters of hot water with twenty-five kilos of caustic-soda lye of 40° Baumè and placed in an autoclave furnished with a stirring mechanism. Fifteen kilos of ethylchlorid or twenty-five kilos of ethylbromid are added, and the autoclave heated for some hours to a temperature of about 100° to 110° centigrade. The ethylated coloring-matter is then filtered off, pressed, and dried. It dyes unmordanted cotton orange shades very fast to light and alkalies.

Example II: The diazo compound obtained as described in Example I is allowed to run into a solution of thirty-two kilos of phenylated beta$_1$ alpha$_4$ amidonaphthol-beta$_3$ sulfoacid with forty kilos of carbonate of sodium in three hundred liters of water. Then the mass is heated to boiling and the coloring-matter salted out, pressed, and dried. It dyes unmordanted cotton brown shades fast to acids and alkalies and considerably fast to the action of light.

For obtaining the other analogous combinations the process is as in Example II.

For the diazo compound may be substituted, with almost the same result, that of the analogous product of condensation which is derived from paratoluylenediamin instead of paraphenylenediamin.

The following are the characteristics of the new coloring-matters: They are brown powders soluble in water with orange to brown colors. Mineral acids produce dark-brown precipitations. Concentrated sulfuric acids dissolve them with a blue color. The coloring-matters are scarcely soluble in alcohol and insoluble in ether and benzene. By means of reducing agents—for instance, zinc-powder and hydrochloric acid—colorless solutions are obtained which contain diamidostilbenedisulfoacid, paraphenylenediamin, and the amido compound of the component used for the combination.

Having thus described my invention, I claim as new and desire to secure by Letters Patent—

The herein-described new disazo coloring-matters, derived from stilbene by diazotizing the product of condensation of two molecules of paranitrotoluenesulfoacid with one molecule of paraphenylenediamin and combining the diazo compound with a suitable compound to form an azo dye, the said coloring-matters forming brown powders, soluble in water with orange to brown color, precipitated by mineral acids in dark-brown flocks, scarcely soluble in alcohol, insoluble in ether and benzene, soluble in concentrated sulfuric acid with a blue color, giving when treated with reducing agents colorless solutions, which contain diamidostilbenedisulfoacid, paraphenylenediamin and the amido compound of the component used for the combination, and which dye unmordanted cotton orange to brown shades, substantially as described.

In testimony that I claim the foregoing as my invention I have signed my name in presence of two subscribing witnesses.

CHRISTOPHER RIS.

Witnesses:
GEORGE GIFFORD,
ALBERT GRAETER.